Aug. 3, 1948.  W. J. MASON  2,446,184
BELT LOADING MACHINE
Filed March 29, 1943  3 Sheets-Sheet 1

Inventor
Willard J. Mason
By C. E. Herrstrom & W. E. Thibodeau
Attorneys

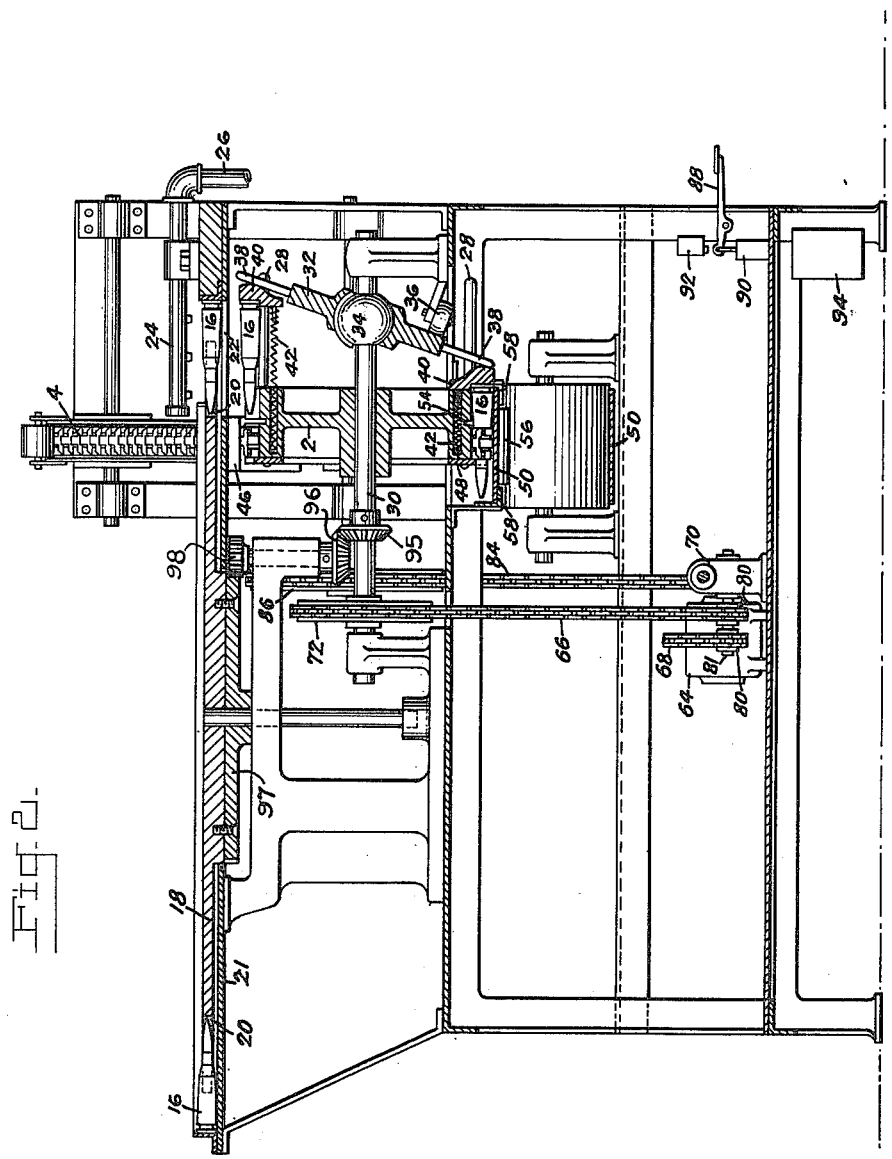

Aug. 3, 1948. W. J. MASON 2,446,184
BELT LOADING MACHINE
Filed March 29, 1943 3 Sheets-Sheet 3
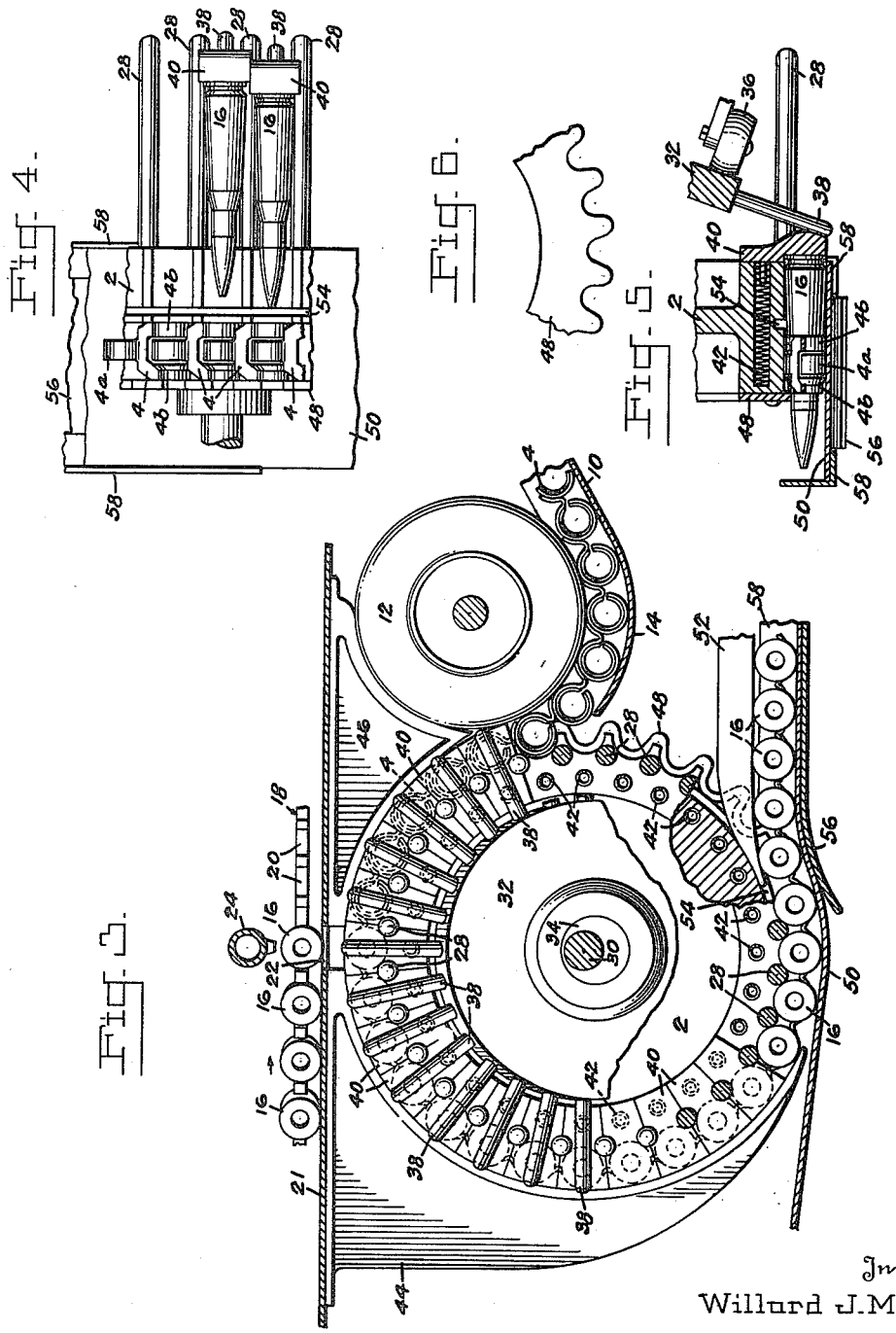
Inventor
Willard J. Mason
By C. E. Herrstrom & W. E. Thibodeau
Attorneys Patented Aug. 3, 1948

2,446,184

UNITED STATES PATENT OFFICE 2,446,184

BELT LOADING MACHINE

Willard J. Mason, Greenwich, Conn.

Application March 29, 1943, Serial No. 481,037

2 Claims. (Cl. 86—48)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to ammunition belt loading machines, particularly to machines for loading ammunition components such as cartridges into belt links.

It is the object of this invention to provide a machine to automatically assemble cartridges and belt links into complete ammunition belts. The object is accomplished by a rotating drum to which links are fed. Cartridges are also fed to the drum and are pushed into the links as the drum rotates. The links approach the drum on an incline to which they feed from a belt. A positively driven feed wheel moves the links from the incline onto the drum. The cartridges are fed to the drum from a circumferentially slotted, rotatable table. An obliquely mounted wheel having circumferentially spaced radial fingers rotates with the drum and engages each cartridge during the rotation to push the cartridge into the link. As the operation is completed, a cartridge stripper frees the assembled belt from the drum, whence the belt falls to a conveyor which carries it to a box.

The specific nature of the invention as well as other objects and advantages thereof will clearly appear from a description of a preferred embodiment as shown in the accompanying drawings in which:

Fig. 1 of the drawings shows an end elevation of a machine made according to the invention. Parts are shown broken away and in section.

Fig. 2 is a view in section substantially on line 2—2 of Fig. 1.

Fig. 3 is an enlarged detail view of the cartridge drum and associated mechanism.

Fig. 4 is a fragmentary top plan view of the cartridge drum and associated mechanism.

Fig. 5 is a section substantially on line 5—5 of Fig. 1, showing a portion of the machine in enlarged detail.

Fig. 6 is a detail view of a portion of a sprocket, which is associated with the cartridge drum.

Figure 1:
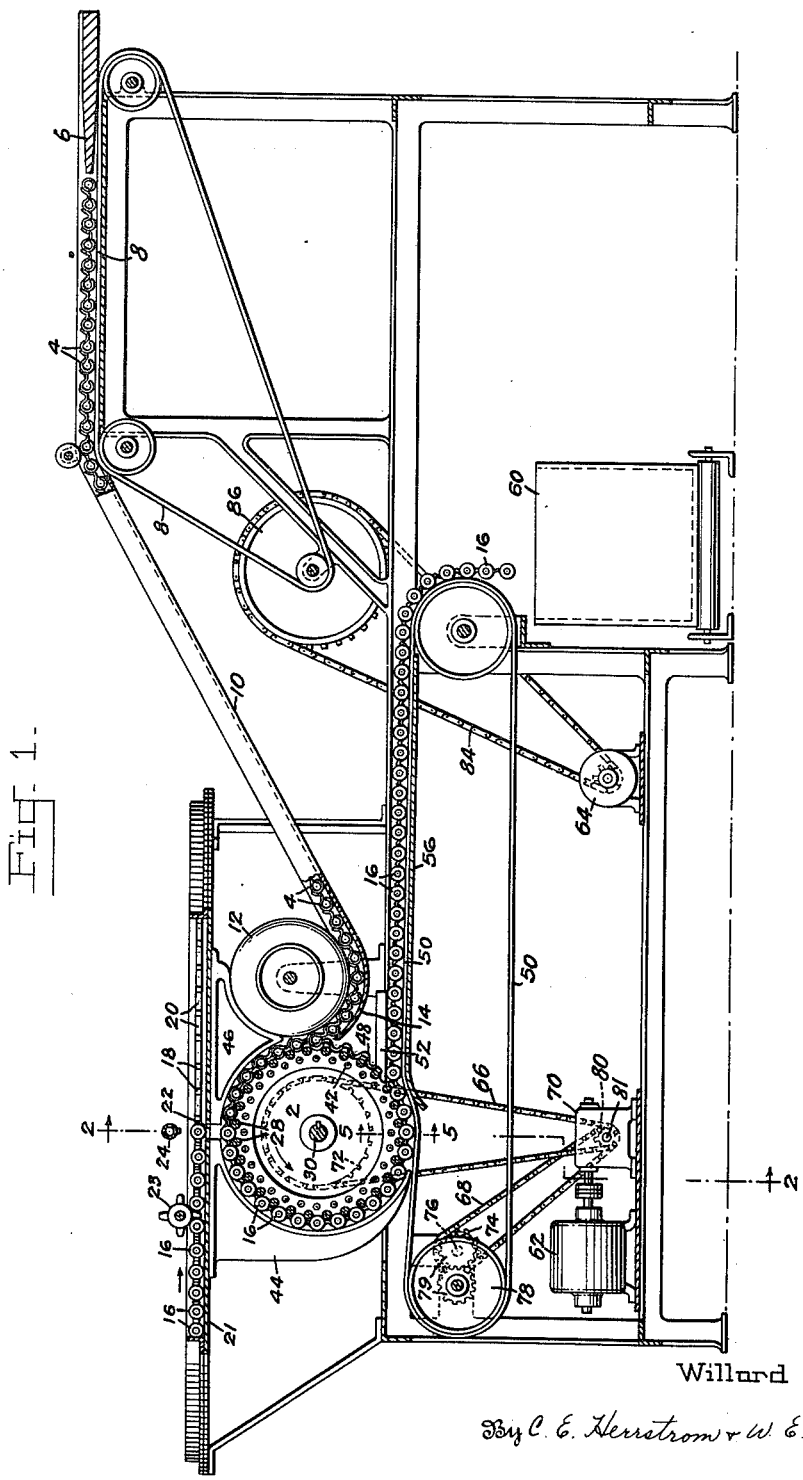

Referring to the drawings in detail, a loading drum 2 is shown, to which links and cartridges are fed separately. Conveyor belt 8 carries the links to the inclined chute 10, down which they slide to a feeder wheel 12, which is preferably provided with a rubber tire to better grip the links as it feeds them up the curved tray portion 14 to the loading drum.

As can best be seen from Figs. 3 and 4, each link 4 comprises a single ring 4a joined to two rings 4b. The single ring 4a fits between the two rings 4b of the adjacent link, and a cartridge engages the two rings 4b of one link and the single ring 4a of the adjacent link much the same as a hinge pin holds the two parts of a hinge together.

Cartridges 16 may be supplied to the drum in any satisfactory manner, but a preferred method is a rotating conveyor table 18 which is slotted at its periphery as shown at 20. Below rotary table 18 there is a stationary table supporting plate 21 which actually carries the cartridges as they are swept along its surface by the sides of slots 20. An opening 22 in the support table permits each cartridge to drop through to the drum. A cartridge counter 23 may be supplied if desired. The cartridges may be expelled from their slots in the rotary table and deposited on the drum by a blast of air from nozzle 24, to which air under pressure is supplied through pipe 26 from a source, not shown. The cartridges drop down onto supporting rods 28 which are held in drum 2. Drum 2 is mounted on shaft 30 for rotation. The same shaft carries a wheel 32 through the medium of a ball and socket joint 34. A guide roller 36 bears against the wheel to keep it at the angle shown in Fig. 2. At the periphery of wheel 32 are mounted push rods or fingers 38. These fingers bear against cartridge pushers 40, which are pressed against the fingers by springs 42. Thus, pushers 40 are carried by, and reciprocate back and forth on, support rods 28, pushed one way by fingers 38 and back again by springs 42. The cartridges are supported on the rods 28 for approximately a quarter turn of the drum, after which the cartridges are supported, along with the links, by a guide member 44. A similar guide member 46 restrains the links in place on the drum between their travel from the curved tray portion 14 to the upper part of the drum, where they begin to be engaged by the cartridges. A stop sprocket 48 holds the links on the drum as the cartridges are pushed into the links by the pushers 40.

At the lower edge of the drum, the assembled cartridge belt leaves the guide member 44, and drops onto a conveyor belt 50. A stripper 52 operating in groove 54 of drum 2 assures that the belt leaves the drum. The assembled cartridge belt is relieved of the clamping action exerted by pushers 40 on the cartridges and stop 48 on the links, inasmuch as springs 42 start to move pushers 40 back as soon as fingers 38 on the wheel 32 start up again on the other side. Belt 50 is supported on a bed plate 56 which extends between supporting angle members 58 and is arranged so that plate 56 and members 58 form a smooth, unbroken surface for the belt. A box 60 is provided to receive the assembled cartridge belt as it leaves the conveyor belt 50.

The drive means for the various moving parts of the invention may be any suitable motive power. Shown in the drawings are electric motors 62 and 64. Motor 62 is connected to drive chains 66 and 68 through a gear reduction unit 70. Chain 66 drives a sprocket 72 keyed to shaft 30, thus furnishing the motive power for drum 2 and wheel 32. Table 18 is likewise rotated with these by means of bevel gears 95, 96, spur gear 97 and pinion 98. Chain 68 drives sprocket 74, which in turn is keyed to shaft 76 to drive conveyor belt pulley 78 through gears 79 one of which is affixed to the shaft of said pulley. It will be noted that the two sprockets 80 on shaft 81 which drives the chains 66 and 68 are the same size, so that chains 66 and 68 move at the same linear speed. In order then, that conveyor belt 50 move at the same speed as the assembled cartridge belt coming off the drum, it is evident that the ratio of the diameters of drum 2 to sprocket 72 must be equal to that of pulley 78 to sprocket 74, since gears 79 are the same size. With this condition obtaining, the conveyor belt would carry away the assembled cartridge belt as fast as it "paid off" the drum. The conveyor belt should not move more slowly than that to avoid piling up of the cartridge belt, and consequent jamming of the machine. Preferably, however, the ratio of diameters of pulley 78 to sprocket 74 is slightly greater than that of drum 2 to sprocket 72, so that the conveyor belt moves slightly faster than the speed with which the completely assembled cartridge belt pays off the drum. This arrangement results in some slippage of the cartridge belt on the conveyor and consequent increase in wear on the belt, but it also keeps the cartridge belt taut, and reduces the likelihood of jamming of the mechanism.

No positive drive is shown for rubber-tired wheel 12, although one may be provided if desired. As shown, wheel 12 is driven by contact with the links on the drum.

Motor 64 is shown as driving a chain 84 which drives sprocket 86. Sprocket 86 is connected to drive link conveyor belt 8, which feeds links to the inclined chute 10. There is no positive coordination between the speed of belt 8 and the peripheral speed of drum 2. However, such synchronization is not necessary, so long as the inclined chute 10 is kept supplied with links. To insure maintenance of that condition, motor speeds, and sprocket and pulley diameters, should be so calculated as to move belt 8 slightly faster than the peripheral speed of drum 2.

Although any suitable control means may be provided for the motors and the compressed air supply, Fig. 2 shows a pedal 88 for control of an air valve 90 and an electric switch 92. A moisture trap 94 will also preferably be provided in the air line.

*Operation.*—With motors 62 and 64 running and air pressure being supplied to nozzle 24, the sequence of operation of the various steps is as follows:

Links are supplied to the link conveyor belt 8, which carries them to inclined chute 10. In curved tray portion 14 at the bottom of the inclined chute, the links are engaged by the rubber-tired wheel 12, which feeds them up onto loading drum 2. Cartridges are placed in the slots 20 of 18.

As a cartridge moves over opening 22 and under nozzle 24, a blast of air dislodges it from its slot and blows it between the two guides 44 and 46 onto the support rods 28 of loading drum 2. As drum 2 turns, it carries cartridges and links with it. Guide 44 holds the cartridges and links against radial outward displacement. Wheel 32 rotates with the loading drum, and brings fingers 38 to bear on pushers 40, which push the cartridges into the interfitting links in their downward travel. Stop sprocket 48 holds the links against being pushed off the drum as the cartridges are pushed into the links.

At the lowermost point of the loading drum, the assembled cartridge belt is stripped from the drum by stripper 52. The assembled belt is carried to box 60 by conveyor belt 50.

I claim:

1. In a machine for assemblying machine gun ammunition belts comprising a series of links having interfitting rings pivoted together by cartridge casings, a frame, a shaft, journaled in said frame on a normally horizontal axis, a drum fixed on said shaft, said drum having its periphery formed to receive said links in interfitting relation and to hold the same against displacement in one direction parallel with the axis of said drum, a series of equally spaced rods extending from one end of said drum adjacent the periphery thereof parallel with said shaft, each two consecutive rods being positioned to support a cartridge therebetween, in alignment with a corresponding pair of interfitting link rings, pusher members carried by said drum, each pusher member being reciprocable parallel to the axis of said drum to engage and move in said one direction a cartridge supported on a corresponding pair of rods, a wheel universally mounted on said shaft adjacent said drum for rotation therewith, a plurality of equally spaced fingers projecting radially from said wheel, means constraining said wheel to rotation in a fixed plane at an angle to said drum whereby each finger engages and moves a respective pusher member parallel to the axis of said drum in said one direction, and means yieldingly urging each said pusher member in the opposite direction.

2. A cartridge link belt loading machine comprising a frame, a drum journaled in said frame for rotation on a normally horizontal axis, said drum having its periphery formed to receive and hold against displacement in one direction parallel with the axis of said drum the interfitted rings of consecutive belt links, a plurality of equally spaced rods extending from one end of said drum adjacent the periphery thereof, each said rod being paralled with the axis of said drum, each two consecutive rods being positioned to support a cartridge in alignment in a direction parallel with the axis of said drum with a respective pair of interfitting rings on said drum, pushers carried by said drum, each pusher being reciprocable in a direction parallel with the axis of said drum to engage a cartridge resting upon a respective pair of rods and move the same in said one direction, to pivotally connect a pair of belt links, a wheel universally mounted adjacent said drum for rotation therewith or an axis concurrent with the axis of said drum, said wheel having a series of equally spaced fingers projecting radially from the periphery thereof, means causing said wheel to rotate in a fixed plane making an acute angle with the plane of said drum, whereby each pusher, in turn, is translated by a respective finger inwardly in said one direction toward said drum as said drum and wheel rotate, means yieldingly urging each pusher outwardly, and means feeding cartridges, one by one, onto said rods at the point at which said pushers are the maximum distance from said drum.

WILLARD J. MASON.

REFERENCES CITED

The following references are of record in the file of this patent:

UNITED STATES PATENTS

| Number | Name | Date |
|---|---|---|
| 2,344,443 | McCord | Mar. 14, 1944 |
| 2,412,747 | Parry | Dec. 17, 1946 |
| 2,413,316 | Freeman | Dec. 31, 1946 |

FOREIGN PATENTS

| Number | Country | Date |
|---|---|---|
| 127,638 | Great Britain | June 12, 1919 |
| 539,184 | Great Britain | Sept. 1, 1941 |
| 656,629 | Germany | Feb. 10, 1938 |
| 300,379 | Italy | Sept. 7, 1932 |